(12) United States Patent
Yoneya et al.

(10) Patent No.: US 7,016,601 B1
(45) Date of Patent: Mar. 21, 2006

(54) METHOD AND APPARATUS FOR STORING DIFFERENT TYPES OF DATA ON THE SAME STORING MEDIUM

(75) Inventors: Satoshi Yoneya, Kanagawa (JP); Masakazu Yoshimoto, Kanagawa (JP); Tomohisa Shiga, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/499,563

(22) Filed: Feb. 7, 2000

(30) Foreign Application Priority Data

Feb. 9, 1999 (JP) ............................... P11-031109

(51) Int. Cl.
    *H04N 5/781* (2006.01)
(52) U.S. Cl. .......................................... 386/96; 386/125
(58) Field of Classification Search ................. 725/87, 725/91, 92, 103, 104, 114, 115, 138, 144, 725/145; 386/96, 98, 45, 125, 126; 711/114; 714/770; H04N 5/76, 5/781, 9/79
    See application file for complete search history.

(56) References Cited

U.S. PATENT DOCUMENTS

| 5,889,921 A | * | 3/1999 | Sugiyama et al. ............ 386/98 |
| 6,226,443 B1 | * | 5/2001 | Morioka et al. .............. 386/82 |

* cited by examiner

*Primary Examiner*—Thai Tran
(74) *Attorney, Agent, or Firm*—Frommer Lawrence & Haug LLP; William S. Frommer; Paul A. Levy

(57) ABSTRACT

A data storing apparatus for inputting and outputting a plurality of types of data in parallel and storing data with a disc shaped record medium that is randomly accessible is disclosed, that comprises an inputting means for inputting a plurality of types of data in parallel and categorizing the plurality of types of data for each type, a recording means composed of at least one disc shaped record medium that is randomly accessible, and a record controlling means for distributively recording at least one channel of and the plurality of types of data that is input by said inputting means to radially divided areas of the disc shaped record medium, the radially divided areas corresponding to the types of data.

28 Claims, 12 Drawing Sheets

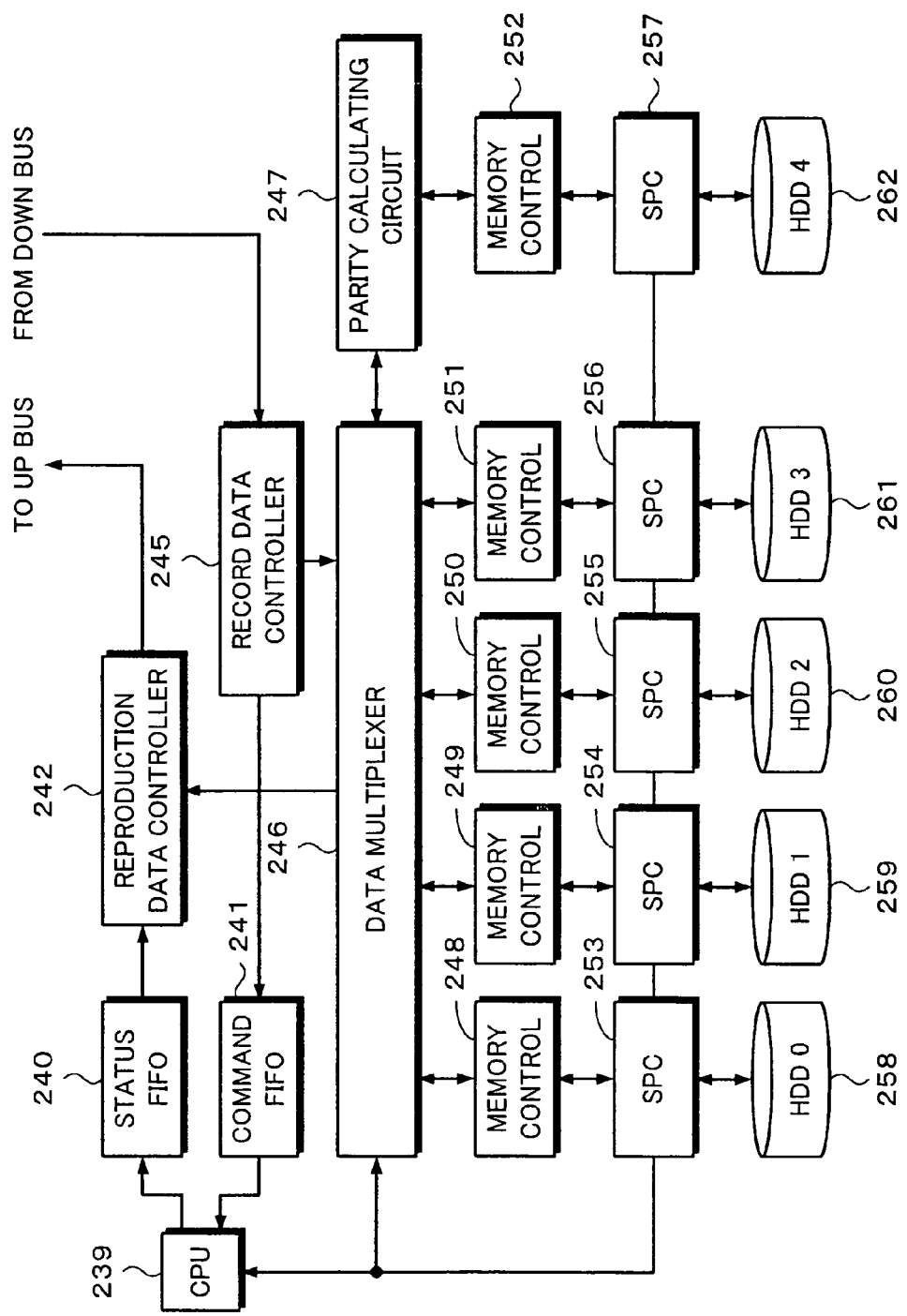

| 1 | 1 | 1 | 1 | 1 | 1 | 1 | 1 |
| 1 | 1 | 0 | 0 | 0 | 0 | 0 | 0 |
| 0 | 0 |   | . | . | . | . |   |
|   |   |   |   |   |   |   |   |
|   |   |   |   |   |   |   |   |

| AUDIO DATA / VIDEO DATA | 16bit 4ch RAID-0 | 16bit 4ch RAID-1 | 20bit 4ch RAID-0 | 20bit 4ch RAID-1 |
|---|---|---|---|---|
| 20Mbps | 75 : 25 | 62.5 : 37.5 | 72 : 28 | 57 : 43 |
| 30Mbps | 83 : 17 | 71 : 29 | 80 : 20 | 67 : 33 |
| 40Mbps | 86 : 14 | 76 : 24 | 84 : 16 | 72 : 28 |
| 50Mbps | 89 : 11 | 80 : 20 | 86 : 14 | 76 : 24 |

METHOD AND APPARATUS FOR STORING DIFFERENT TYPES OF DATA ON THE SAME STORING MEDIUM

BACKGROUND OF THE INVENTION

1. Field of the Invention

The present invention relates to a data storing apparatus, a method thereof, a data delivering apparatus, and a method thereof suitable for storing and reproducing a large amount of video data and audio data corresponding thereto used in for example a broadcasting station.

2. Description of the Related Art

In a broadcasting station, video data and audio data of a commercial message, a drama, and so forth are handled as a pair. On the other hand, for a news material used in a news program, audio data is added to video data that has been prepared. Thus, in this case, audio data and video data are often separately handled. When video data and audio data are handled as a pair, no problem takes place. However, when they are separately handled, some processes are required for them.

Conventionally, video data and audio data are simultaneously recorded on a linear record medium such as a magnetic tape. Thus, with one record medium, it is impossible to simultaneously reproduce video data recorded in a particular area and audio data recorded in another area. To simultaneously reproduce them, it is necessary to use for example two video cassette recorders (hereinafter, referred to as VCRs) so as to reproduce video data with one VCR and reproduce audio data with the other VCR.

In contrast, new type record mediums such as a hard disk drive and a magneto-optical disc drive (referred to as HDD and MO, respectively), nonlinear data is randomly accessed. Hereinafter, such record mediums are referred to as nonlinear record mediums against the linear record mediums such as a magnetic tape. When a video signal and an audio signal are digitized and recorded as video data and audio data on a nonlinear record medium, the video data and audio data can be separately reproduced in some measure.

In recent years, as the CATV (Cable Television) and digital broadcasts are becoming common, a large number of information channels are being provided. Thus, there are needs for recording and reproducing a plurality of channels of video/audio data with one video/audio data recording and reproducing apparatus and for reproducing one channel of video/audio data while recording another channel therewith. To satisfy such needs, an apparatus referred to as video server (A/V server (Audio and/or Video) server) that records video/audio data with a random access record medium such as a hard disk is becoming common.

Generally, in a broadcasting station and so forth, video data should be reproduced with high quality. Thus, an A/V server used in a broadcasting station and so forth should have high data transmission rate for high picture quality and high audio quality and a large storage capacity for long time data.

Thus, a recording and reproducing apparatus that stores video data and audio data and processes them in parallel with a plurality of hard disk drives (HDDs) is used as an A/V server. With such an A/V server, an attempt for accomplishing a high speed data transmission and a large storage capacity has been made. In addition, an attempt for accomplishing a high reliability structure with parity data that allows the system to operate even if one HDD gets defective has been made.

Thus, a variety of applications become available. For example, an A/V server having multiple channels can be accomplished. In other words, for example, multiple channels of programs corresponding to contents and broadcast type can be accomplished. For example, material data composed of a plurality of programs of video/audio data may be distributively recorded and they are delivered at the same time. Alternatively, the same material data may be delivered on a plurality of channels so that the program start time differs in each of the channels. With such an A/V server, a VOD (Video On Demand) system and an NVOD (Near Video On Demand) system that deliver many channels of video data in parallel can be accomplished.

Such an A/V server can be applied to a recording and reproducing apparatus corresponding to RAID technologies using a plurality of sets of HDDs. The RAID technologies were proposed by Patterson et. al., in ("A Case for Redundant Arrays of Inexpensive Disks (RAID)", ACM SIG-MOND Conference, Chicago, ILL, Jun. 1–3, 1988).

In the paper by Patterson et. al., RAID systems are categorized as RAID-1 to RAID-5 corresponding to the redundancies and structures thereof. In RAID-1, a mirroring structure of which the same data is written to two HDDs is used. In RAID-3, input data is divided into data blocks having a predetermined data length and the divided data blocks are recorded to a plurality of HDDs. In addition, parity data is generated by exclusively ORing the data blocks recorded in the individual HDDs and writing the parity data to another HDD. In RAID-5, data is divided into large data blocks. One divided data block is written to one HDD. In addition, data blocks corresponding to individual HDDs are exclusively ORed. The resultant data (parity data) is distributively recorded to other HDDs.

Conventionally, video data and audio data are recorded to a RAID type recording and reproducing apparatus. Video data for a predetermined time unit (for example, one frame) and audio data corresponding thereto are recorded on adjacent positions of a record medium (HDD) as shown in FIG. 1. Referring to FIG. 1, video data 101 and audio data 102 are recorded from the outer periphery to the inner periphery as circumferential tracks on a hard disk 100 frame by frame.

However, in this method, when video data and audio data are reproduced in a combination, a seek time takes place. In other words, since the data amount of video information is large, the seek time of the HDD cannot be ignored against a required data transmission rate.

To solve the problem of the seek time, a method for recording video data and audio data to different HDDs has been proposed. FIG. 2 shows an example of the structure of a conventional A/V server. An input device 121 that is composed of for example a digital VCR and a satellite receiving system is connected to an A/V server 120. The input device 121 supplies digital video data and audio data to the A/V server 120. In addition, an output device 122 composed of for example a monitor and a transmitting system is connected to the A/V server 120.

The A/V server 120 has an HDD array 124 and a HDD array 125. The HDD array 124 and the HDD array 125 record video data and audio data, respectively. The inputting process of the input device 121, the recording processes of the HDD arrays 124 and 125 for the input data, and the outputting process of the output device for the reproduced data are controlled by a processor 123.

Video data and audio data are extracted from the input data received from the input device 121. The extracted video data is recorded to the HDD array 124 under the control of the processor 123. On the other hand, the extracted audio data is recorded to the HDD array 125.

According to such a method, video data and audio data are separately recorded to the HDD arrays 124 and 125, respectively. Thus, video data and audio data extracted from the HDD arrays 124 and 125 can be freely combined and used. However, in this method, the HDDs arrays 124 and 124 that record video data and audio data, respectively, are required.

In such a method, when one of the HDD arrays 124 and 125 becomes full, even if the other is not full, no further data can be recorded.

OBJECTS AND SUMMARY OF THE INVENTION

Therefore, an object of the present invention is to provide a data storing apparatus, a method thereof, a data delivering apparatus, and a method thereof that allow video data and audio data to be freely combined and reproduced, the number of record mediums to be suppressed, and the storage capacities thereof to be effectively used.

A first aspect of the present invention is a data storing apparatus for inputting and outputting a plurality of types of data in parallel and storing data with a disc shaped record medium that is randomly accessible, the apparatus comprising an inputting means for inputting a plurality of types of data in parallel and categorizing the plurality of types of data for each type, a recording means composed of at least one disc shaped record medium that is randomly accessible, and a record controlling means for distributively recording at least one channel of and the plurality of types of data that is input by said inputting means to radially divided areas of the disc shaped record medium, the radially divided areas corresponding to the types of data.

A second aspect of the present invention is a data delivering apparatus for inputting and outputting a plurality of types of data in parallel and for reproducing and delivering data stored in data storing means composed of a disc shaped record medium that is randomly accessible, the apparatus comprising a data storing means composed of at least one disc shaped record medium that is randomly accessible, a reproducing means for reproducing at least one channel of and the plurality of types of data from said data storing means, the plurality of types of data being allocated and recorded in radially divided areas, and an outputting means for handling at least one channel of and the plurality of types of data reproduced by said reproducing means and outputting at least one channel of and the plurality of types of data as one data stream.

A third aspect of the present invention is a data storing method for inputting and outputting a plurality of types of data in parallel and storing data with a disc shaped record medium that is randomly accessible, the method comprising the steps of (a) inputting a plurality of types of data in parallel and categorizing the plurality of types of data for each type, (b) recording the data to recording means composed of at least one disc shaped record medium that is randomly accessible, and (c) distributively recording at least one channel of and the plurality of types of data that is input at step (a) to radially divided areas of the disc shaped record medium, the radially divided areas corresponding to the types of data.

A fourth aspect of the present invention is a data delivering method for inputting and outputting a plurality of types of data in parallel and for reproducing and delivering data stored in data storing means composed of a disc shaped record medium that is randomly accessible, the method comprising the steps of (a) reproducing at least one channel of and the plurality of types of data from the data storing means, the plurality of types of data being allocated and recorded in radially divided areas, and (b) handling at least one channel of and the plurality of types of data reproduced at step (a) and outputting at least one channel of and the plurality of types of data as one data stream.

As described above, according to the present invention, the inputting means categorizes parallel input data corresponding to the plurality of types of data. A plurality of channels of and a plurality of types of data are distributively recorded to radially divided areas of a disc shaped record medium. When a plurality of types of data are reproduced, they can be effectively reproduced.

These and other objects, features and advantages of the present invention will become more apparent in light of the following detailed description of a best mode embodiment thereof, as illustrated in the accompanying drawings.

BRIEF DESCRIPTION OF THE DRAWINGS

FIG. 5 is a block diagram showing an example of a RAID structure used in the recording and reproducing apparatus according to the present invention;

FIGS. 12A and 12B are schematic diagrams showing examples of logical address maps of video data and audio data to be written;

FIG. 13 is a schematic diagram showing an example of an area division ratio of an HDD array allocated corresponding to the data rate of video data.

DETAILED DESCRIPTION OF THE PREFERRED EMBODIMENTS

Figure 1:
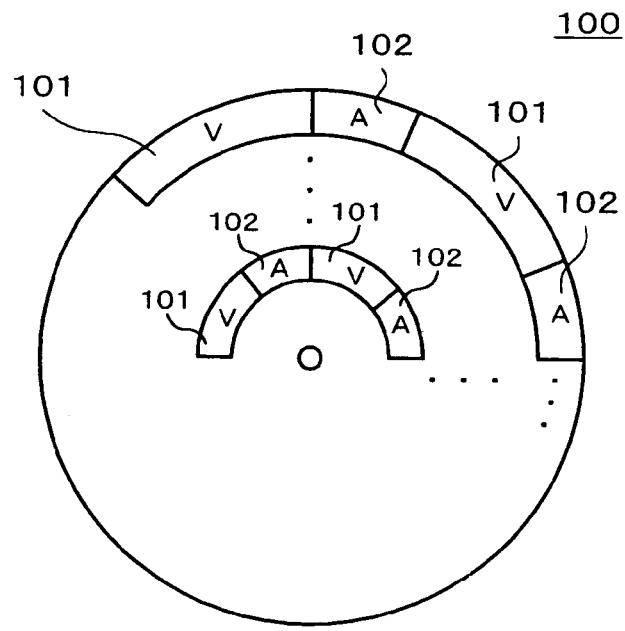
FIG. 1 is a schematic diagram showing an example of video data and audio data recorded on a disk according to a related art reference.
Figure 2:
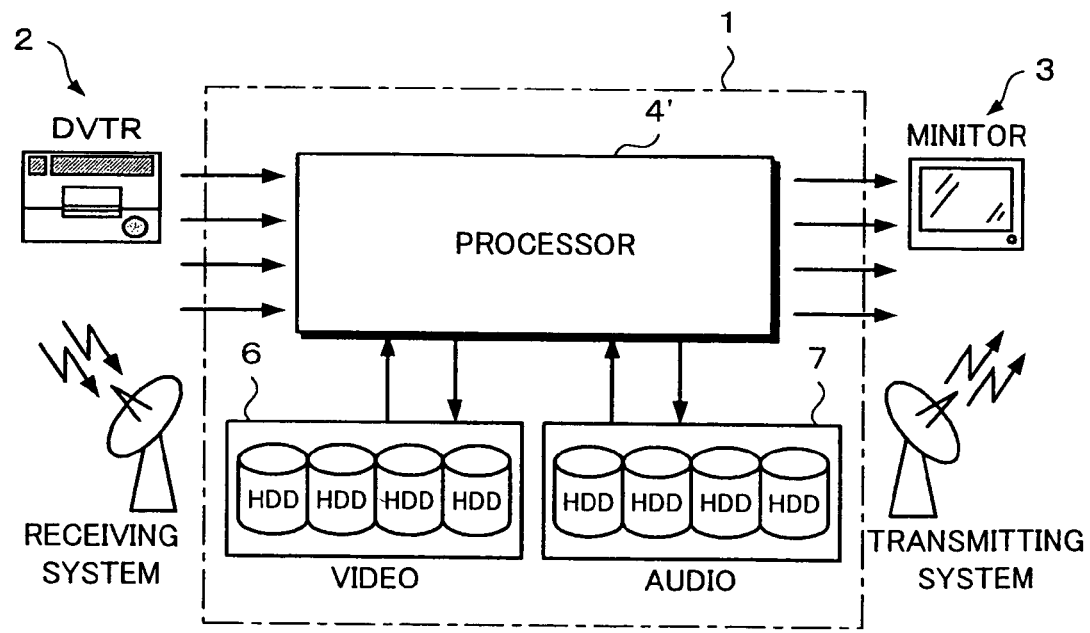
FIG. 2 is a schematic diagram showing an example of the structure of an A/V server according to the related art reference.

Next, an embodiment of the present invention will be described. First of all, with reference to FIGS. 3, 4A, 4B, and 5, a RAID (Redundant Arrays of Inexpensive Disks) type recording and reproducing apparatus will be described. The apparatus has a plurality of input/output processing portions 10A, 10B, and 10C that process a plurality of channels of data in parallel. In other words, the input/output processing portions 10A, 10B, and 10C each process one channel of input data and one channel of output data. The input/output processing portions 10A to 10C will be described later in detail.

The recording and reproducing apparatus has a plurality of RAIDs 20A, 20B, 20C, 20D, and 20E as record mediums. Each of the RAIDs 20A, 20B, 20C, 20D, and 20E has a plurality of HDDs. The input/output processing portions 10A, 10B, and 10C are connected to the RAIDs 20A, 20B, 20C, 20D, and 20E through buses 30 and 31. The bus 30 is also referred to as down bus. Data that is output from the input/output processing portions 10A to 10C is supplied to the RAIDs 20A to 20E through the down bus 30. On the other hand, the bus 31 is also referred to as up bus. Data that is output from the RAIDs 20A to 20E is supplied to the input/output processing portion 10A to 10C through the up bus 31.

Data including video data and audio is supplied from the outside of the apparatus as input data DIN to the input/output processing portion 10A. The input/output processing portion 10A performs predetermined processes for example a process for extracting video data and audio data from the input data and a process for compression-encoding the extracted data and audio data. The compression-encoding process is performed corresponding to for example MPEG2 (Moving Picture Experts Group-2) method. The processed data is converted into data corresponding to a predetermined format for a hard disk that is a record medium disposed downstream of the input/output processing portion 10A.

As the data transmission format, for example an SDI (Serial Digital Interface) signal corresponding to SMPTE-259n standard or an SDTI (Serial Digital Transfer Interface) signal corresponding to SMPTE-305n standard may be used. Alternatively, as the data transmission format, an ATM (Asynchronous Transfer Mode) signal may be used. The compression-encoding process may be an intra-frame compressing method such as DV as well as inter-frame correlation compressing method such as MPEG.

The input data DIN that has been processed and converted by the input/output processing portion 10B is supplied to the RAIDs 20A to 20E through the bus 30. The RAIDs 20A to 20E perform predetermined processes for the data received from the input/output processing portion 10A and records the resultant data to respective HDDs of the RAIDs 20A to 20E.

When data is reproduced from the HDDs of the RAIDs 20A to 20E, the data that is read therefrom is supplied to the input/output processing portions 10A to 10C through the bus 31. When data received from the RAIDs 20A to 20E has been compression-encoded, the input/output processing portions 10A to 10C decode the data and convert the decoded data into a transmission data format. The resultant data is supplied as output data DOUT to the outside of the apparatus.

Since the input/output processing portions 10A to 10C are discrete circuit blocks, they can process respective input data in parallel. However, the bus 30 (and the bus 31) are in common with the input/output processing portions 10A to 10C. Thus, data is supplied from the input/output processing portions 10A to 10C to the bus 30 at the same time. In this situation, all the data cannot be properly processed.

To solve such a problem, a time slot generating circuit 35 is disposed. The time slot generating circuit 35 generates time slots that allow the input/output processing portions 10A to 10C to use the buses 30 and 31. For example, a predetermined time period (for example, one second) is defined as one cycle. One cycle is divided into time slots corresponding to the number of input/output portions 10A to 10C. The time slot generating circuit 35 generates a time slot signal TSL that represents a designated time slot.

The time slot signal TSL is supplied to the input/output processing portions 10A to 10C. The time slots are successively assigned to the input/output processing portions 10A to 10C. The input/output processing portions 10A to 10C supply input data to the RAIDs 20A to 20E through the bus 30 in the assigned time slots.

In other words, predetermined time intervals (namely, time slots) are successively assigned to the input/output processing portions 10A to 10C. Thus, the input/output processing portions 10A to 10C operate in the assigned time intervals. Strictly speaking, although the input/output processing portions 10A to 10C do not input and output data, they likely input and output data at the same time on a plurality of channels (in this example, three channels) in a longer time period than time slots.

In this example, the input/output processing portions 10A to 10C and the RAIDs 20A to 20E are connected through the two buses that are a down bus (bus 30) and an up bus (bus 31). Thus, on data paths that connect the input/output processing portions 10A to 10c and the RAIDs 20A to 20E, input data does not collide with output data. Consequently, the input/output processing portions 10A to 10C simultaneously perform an inputting process and an outputting process at the same time.

Figure 3:
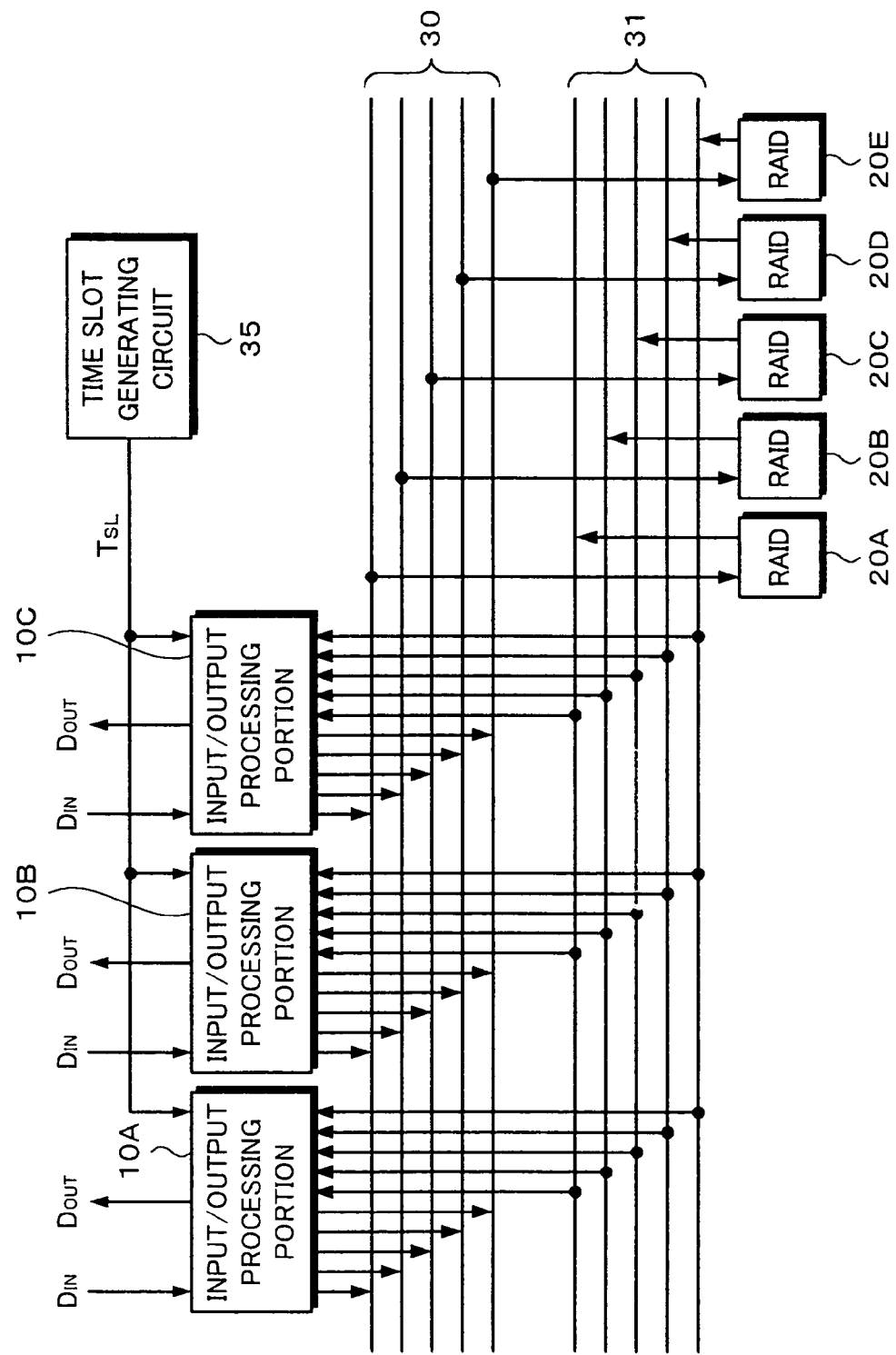
FIG. 3 is a block diagram showing an example of the overall structure of a recording and reproducing apparatus according to the present invention.

Each of the buses 30 and 31 has a plurality of data paths corresponding to the number of RAIDs connected thereto (in the example shown in FIG. 3, each of the buses 30 and 31 has five data paths). The input/output processing portions 10A to 10C may be pre-assigned the RAIDs 20A to 20E. In this case, the process time becomes shorter than the case that the input/output processing portions 10A to 10C assign input data and output data to the RAIDs 20A to 20E. When the RAIDs 20A to 20E process input data and output data corresponding to commands received from the input/output processing portions 10A to 10C, they can manage the RAIDs 20A to 20E.

Figures 4A, 4B:
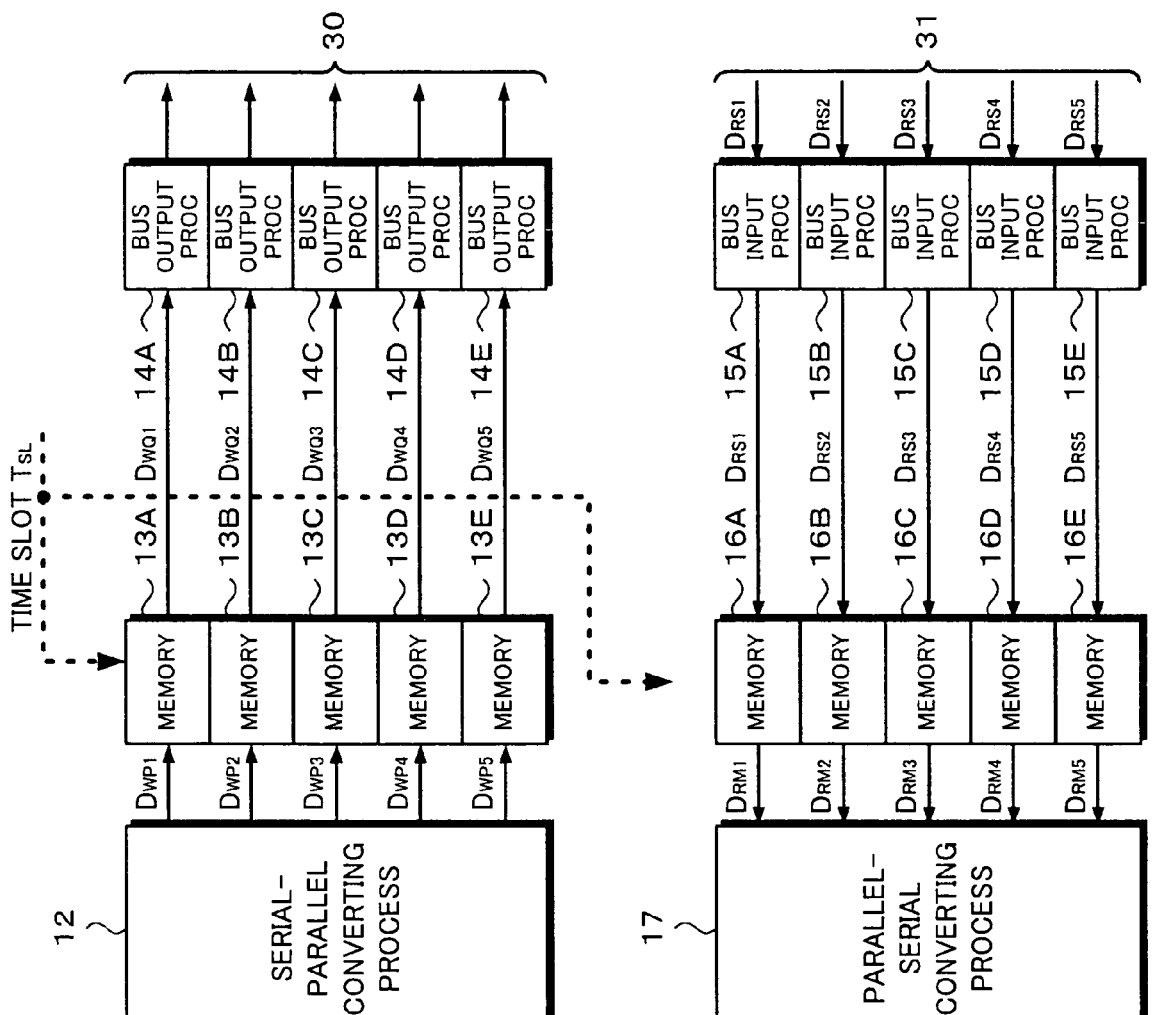
FIGS. 4A and 4B are block diagrams showing an example of the structure of input/output processing portions of the recording and reproducing apparatus according to the present invention.

FIGS. 4A and 4B show an example of the structure of each of the input/output processing portions 10A to 10C. For simplicity, the structure of only the input/output processing portion 10A will be described. The input/output processing portion 10A is mainly composed of a recording system shown in FIG. 4A and a reproducing system shown in FIG. 4B. The recording system is composed of an input circuit 11, a serial—parallel converting circuit 12, memories 13A to 13E, and bus output processing circuit 14A to 14E. On the other hand, the reproducing system is composed of bus input processing circuits 15A to 15E, memories 16A to 16E, a parallel—serial converting circuit 17, and an output circuit 18.

Next, the recording system will be described. Input data DIN in an external transmission format is supplied to the input circuit 11. The input data DIN is data of which video data and audio data in a standard digital video format such as D1 or D2 is transmitted in the above-described transmission format such as an SDI signal. The video data and audio data are transmitted in series.

The input circuit 11 extracts video data and audio data from the transmission format data. When necessary, data to be recorded is compression-encoded in a predetermined method. The input circuit 11 supplies data DW to the serial—parallel converting circuit 12. The serial—parallel converting circuit 12 converts the serial data into parallel data DW. In addition, the serial—parallel converting circuit 12 distributes the parallel data DW to the respective RAIDs. In this example, since the apparatus has five RAIDs, the parallel data DW is distributed to the five RAIDs as data DWP1 to DWP5.

For example, data DWP1 is stored in the memory 13A. The data stored in the memory 13A is read for a time period corresponding to a time slot assigned by the time slot generating circuit 35 corresponding to the time slot signal TSL. Data DWQ1 that is read from the memory 13A is supplied to the bus output processing circuit 14A. The bus output processing circuit 14A converts the data DWQ1 into transmission format data for the bus 30.

In the transmission format data for the bus 30, a command for the RAID 20A is superimposed to data written to the RAID 20A and a synchronous signal is added at the beginning of the resultant data. The command for the RAID 20 is for example a write command or a read command that causes data to be written to or read from each HDD of the RAID 20A. Data of which a status for a command is superimposed to read data is supplied from the RAID 20A to the input/output processing portions 10A to 10C.

The output data DWP2 to DWP5 of the serial—parallel conversion processing circuit 12 (namely, the bus output processing circuits 14B to 14E) are processed in the same manner as the data DWP1 (of the bus output processing circuit 14A).

In the reproducing system shown in FIG. 4B, the reverse process of the recording system is performed. In other words, data DRS1 that is read from for example the RAID 20A is supplied to the bus input processing portion 15A through the bus 31. The bus input processing portion 15A synchronizes with the bus 31 and writes the data DRS1 to the memory 16A in synchronization with the bus 31. The data DRS1 written to the memory 16A is read in a time slot assigned corresponding to the time slot signal TSL and supplied to the parallel—serial converting circuit 17.

In the reproducing system, the data DRS2 to DRS5 (that are output from the bus input processing circuits 15B to 15E) are processed in the same manner as the data DRS1 (of the bus input processing circuit 15A).

The parallel—serial converting circuit 17 converts the data DRM1 to DRM5 received from the memories 16A to 16E into serial data DMS. The data DMS is supplied to the output circuit 18. In the output circuit 18, the data DMS is converted into the above-described transmission format data (for example, an SDI signal) and output as output data DOUT to the outside of the apparatus.

FIG. 5 is a block diagram showing an example of the structure of each of the RAIDs 20A to 20E. Since the structures of the RAIDs 20A to 20E are the same, for simplicity, only the structure of the RAID 20A is described. The RAID 20A is a disk array device of which a plurality of HDDs 258 to 262 link and operate. In this example, the HDDs 258 to 261 are disk devices for data. The HDD 262 is a disk device for parity of data recorded in the HDDs 258 to 261.

When data is recorded, the bus 30 is connected to a record data controller 245. Data is supplied from the bus 30 to the record data controller 245. As was described above, the data supplied from the bus 30 to the record data controller 45 is composed of a synchronous signal, command data, and record data (video data/or audio data). For simplicity, the record video/audio data is referred to as video data. When the synchronous signal at the beginning of the input data is detected by the record data controller 245, the command data preceded by the synchronous signal is supplied and stored in a command FIFO 241.

On the other hand, the video data preceded by the command data is supplied from the record data controller 245 to a data multiplexer 246. The data multiplexer 246 is connected to video data recording HDDs 258, 259, 260, and 261 through memory controllers 248, 249, 250, and 251 and SCSI protocol controllers (SPC) 253, 254, 255, and 256. The data multiplexer 246 is connected to a parity calculating circuit 257. The parity data recording HDD 262 is connected to the parity calculating circuit 257 through a memory controller 252 and an SPC 257. In addition, the SPCs 253 to 257 are connected in series. The SPC 253 is connected to a CPU 239.

The data multiplexer 246 distributes video data to the HDDs 258 to 261. The data multiplexer 246 has buffer memories corresponding to the HDDs 258 to 261 and distributively writes a predetermined amount (a predetermined number of bytes) of video data and audio data to the buffer memories. When all the data has been written to the buffer memories, the data is transferred from the buffer memories to the HDDs 258 to 261.

The parity calculating circuit 257 calculates redundant data (namely, parity data) corresponding to the HDDs 258 to 261 and records the parity data to the HDD 262.

When the recording operation is normally completed, the CPU 239 generates status data that represents the normal completion of the recording operation. The status data is stored to a status FIFO 240. Thereafter, the status data is supplied to a reproduction data controller 242 at a predetermined timing. The reproduction data controller 242 generates a synchronous signal, adds the status data to the synchronous signal, and supplies the resultant data to the bus 31.

When data is reproduced, command data that causes the data to be reproduced is supplied from the bus 30. Corresponding to the command data, video data and parity data are read from the HDDs 258 to 261 and the HDD 262, respectively. The data multiplexer 246 combines the video data that is read from the HDDs 258 to 261. The combined video data is supplied to the reproduction data controller 242. The CPU 239 generates status data corresponding to the reproducing operation. The status data is stored in the status FIFO 240 and then supplied to the reproduction data controller 242 at a predetermined timing. The reproduction data controller 242 generates a synchronous signal, adds the status data and video data to the synchronous signal, and supplies the resultant data to the bus 31.

In the above-described example, each of the RAIDs has five HDDs. However, it should be noted that the number of HDDs of each of the RAIDs is not limited to five. In addition, in the example, each of the RAIDs is structured corresponding to RAID-3 or RAID-5. Alternatively, each of the RAIDs may be structured corresponding to RAID-1 using mirroring HDDs. Moreover, in the example, five RAIDs are used. Alternatively, two RAIDs may be used. Furthermore, the number of input/output processing portions can be increased or decreased corresponding to the number of channels of data to be processed.

Next, an embodiment of the present invention will be described. As was described in the related art reference, a recording and reproducing apparatus having the above-described RAIDs is referred to as A/V server (or video server). According to the present invention, the record area of each hard disk drive (HDD) that composes each RAID of the A/V server is divided into a video area for video data and an audio area for audio data.

Figure 6:
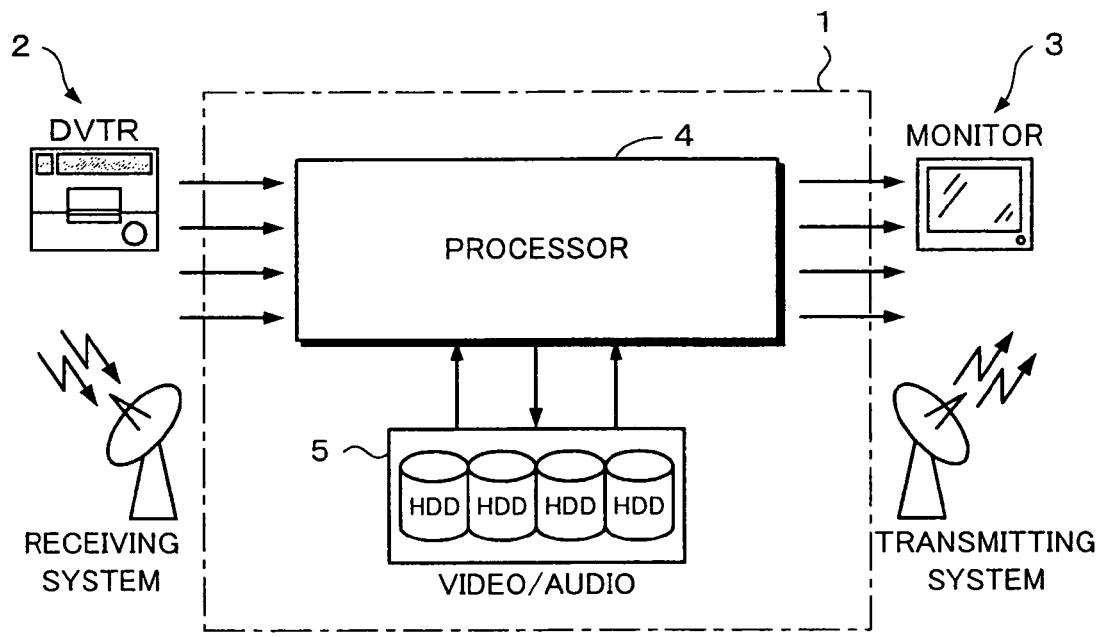
FIG. 6 is a schematic diagram showing an example of the structure of an A/V server according to an embodiment of the present invention.

FIG. 6 is a schematic diagram showing an example of the structure of the A/V server. An input device 2 and an output device 3 are connected to an A/V server 1. The recording and reproducing apparatus described with reference to FIGS. 3 to 5 can be applied to the A/V server 1. The input device 2 is for example a digital VCR or a satellite receiving system that outputs a video signal and/or an audio signal as digital data. Of course, the input device 2 may convert an analog video signal and/or an analog audio signal into digital signals and output them as digital data. The output device 3 is for example a monitor or a transmitting system. The video data and the audio data that are received from the input device 2 are stored in the A/V server 1.

Desired data is selected from video data and audio data stored in the A/V server 1 corresponding to a command received from a delivering system (not shown). The selected data is supplied to the output device 3. When the output device 3 is a monitor, video data is displayed and audio data is reproduced. When the output device 3 is a transmitting system, video data and audio data that are modulated corresponding to a predetermined method are transmitted to a satellite.

The A/V server 1 has a hard disk array (HDD array) composed of a plurality of HDDs and a controlling portion thereof. In the structure shown in FIG. 6, a HDD array 5 that stores both video data and audio data is disposed. The data input operation and the data output operation to/from the HDD array 5 are controlled by the processor 4.

The HDD array 5 is equivalent to one of the RAIDs 20A, 20B, 20C, 20D, and 20E shown in FIG. 3. In other words, the HDD array 5 is composed of a plurality of HDDs 258, 259, 260, 261, and 262 shown in FIG. 5. Data is recorded to the HDDs 258 to 261. The HDD 262 records parity of data recorded in the HDDs 258 to 261. The processor 4 is equivalent to one of the input/output processing portions 10A, 10B, and 10C shown in FIG. 3. In other words, in the example shown in FIG. 3, the A/V server 1 has a plurality of processors 4 and a plurality of HDD arrays 5.

Figure 7:
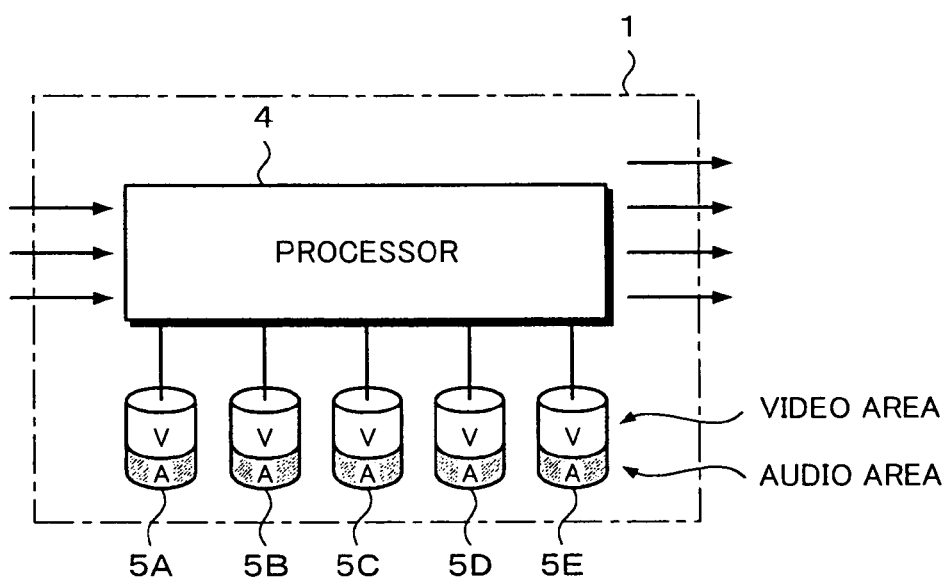
FIG. 7 is a schematic diagram showing data arrangement of an HDD array of the A/V server according to the present invention.

FIG. 7 is a schematic diagram showing a data arrangement of the HDD array 5 of the A/V server 1 shown in FIG. 6. In FIG. 7, for simplicity, the HDDs 5A to 5E are directly connected to the processor 4. Actually, the HDDs 5A to 5E compose the HDD array 5. The processor 4 and the HDD array 5 are connected. In this example, the HDD array 5 has five HDDs 5A, 5B, 5C, 5D, and 5E. The record area of each of the five HDDs 5A, 5B, 5C, 5D, and 5E is divided into a video area for video data (the video area is denoted by "V" in FIG. 7) and an audio area for audio data (the audio area is denoted by "A" in FIG. 7).

According to the embodiment, the same RAID system is applied for both the video area and the audio area. When the RAID-3 system is applied, the HDDs 5A to 5D are used for video data and audio data and the HDD 5E is used for parity.

Figure 8:
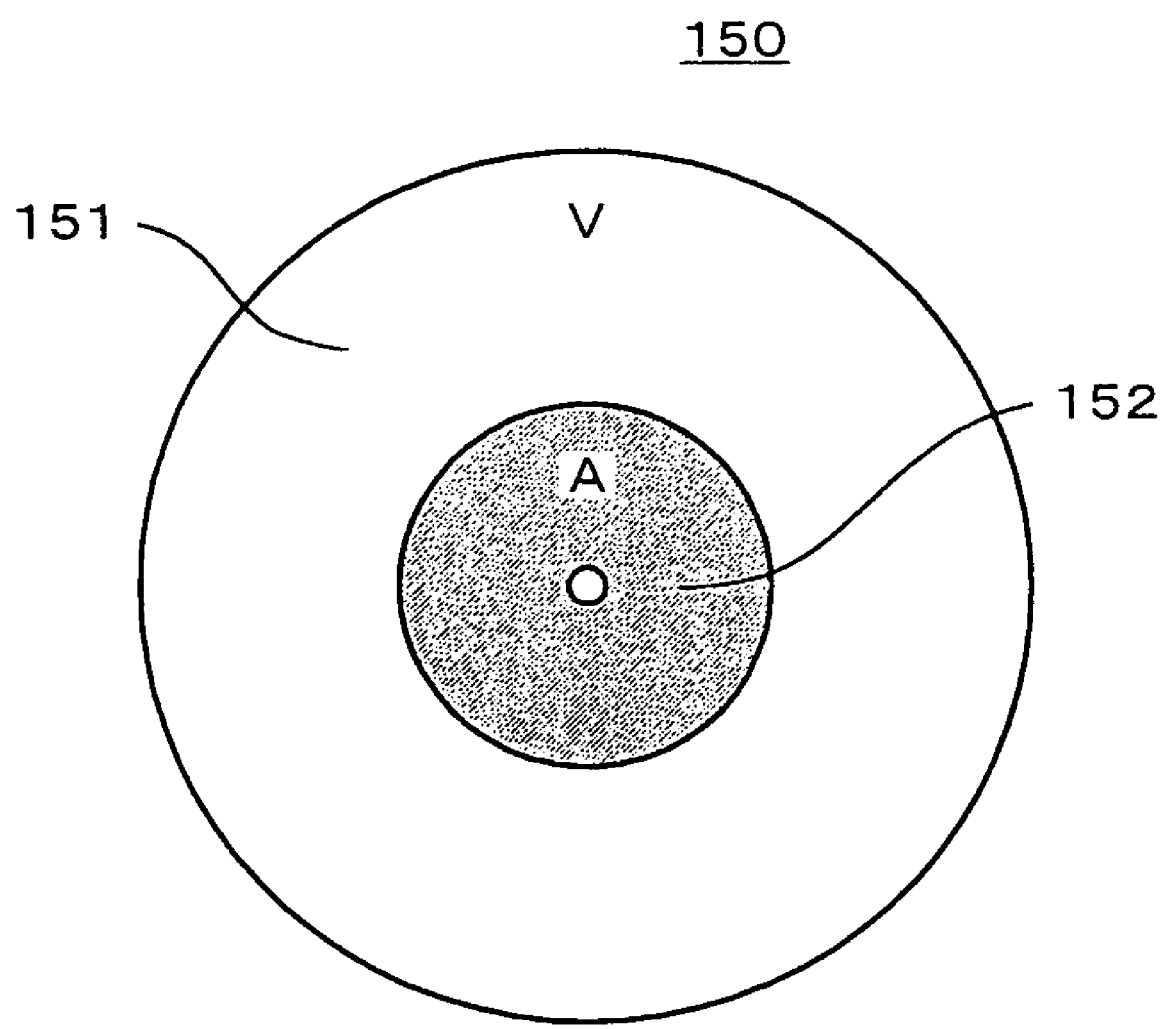
FIG. 8 is a schematic diagram showing an example of an area allocation of an HDD.

In FIG. 7, for simplicity, each HDD is divided into an upper area and a lower area. Actually, record mediums of the HDDs 5A, 5B, 5C, 5D, and 5E are disc-shaped. As shown in FIG. 8, each disc has areas that are radially allocated. In this example, the outer periphery side and the inner periphery side of a disc 150 are allocated a video area 151 and an audio area 152, respectively. When each of the HDDs 5A, 5B, 5C, 5D, and 5E has a plurality of discs as record mediums, each of the discs has areas that are radially allocated.

When an audio area for audio data is successively allocated on a disc, the seek time for which audio data is randomly accessed becomes short.

Next, with reference to FIGS. 9 to 13, a recording process and a reproducing process for recording audio data and video data to radially allocated areas of each HDD of the HDD array 5 and for reproducing audio data and video data therefrom will be described.

Figure 9:
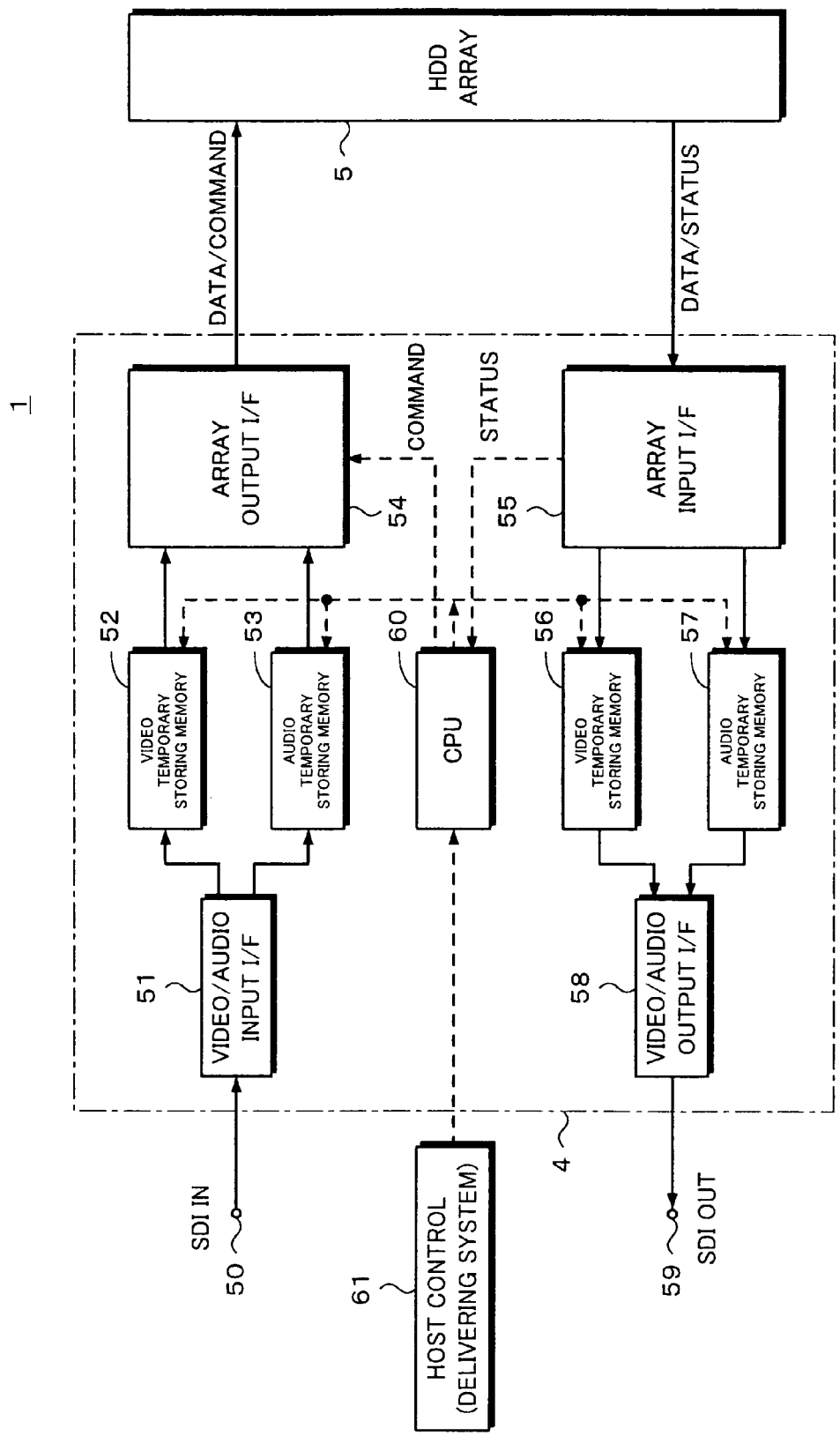
FIG. 9 is a block diagram showing the structure of a block of a processor of the A/V server according to the embodiment of the present invention.
Figure 10:
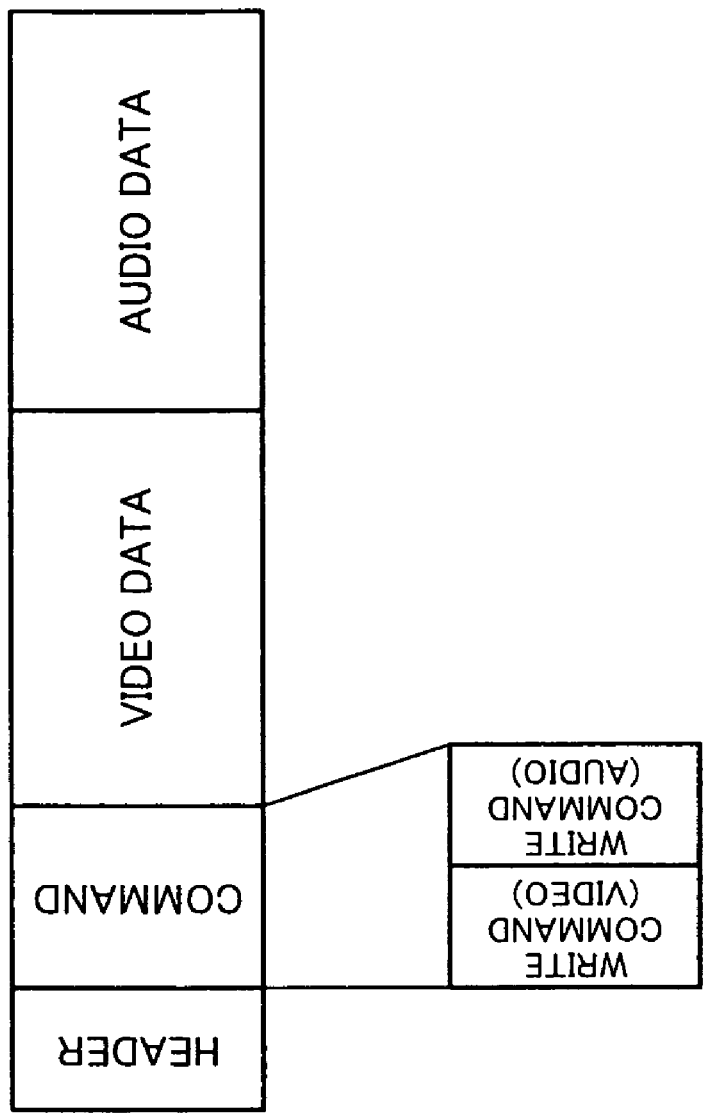
FIGS. 10A, 10B, and 10C are schematic diagrams showing an example of a data stream.

FIG. 9 shows an example of the structure of a block of a processor 4 of the A/V server 1 according to the embodiment of the present invention. First of all, the recording system of the A/V server 1 will be described. Data including audio data and video data in the above-described SDI format is received from a terminal 50. In the SDI format, video data is serially received line by line. At this point, video data is transmitted with a valid picture area of one line of a main picture portion. In contrast, audio data is transmitted with other than the valid picture area of a predetermined line.

Input data is supplied to a video/audio input interface 51. The video/audio input interface 51 counts the line number of input data and extracts video data and audio data from the input data. The extracted video data is temporarily stored in a video temporary storing memory 52. The extracted audio data is temporarily stored in an audio temporary storing memory 53. Each of the memories 52 and 53 has three discrete buffer memories each of which stores 16 frames of data. In other words, each of the memories 52 and 53 has three banks. When 16 frames of data are stored to one buffer memory, the data is swept out therefrom. In addition, data is written to the next buffer memory. Video data and audio data that are output from the memories 52 and 53 are supplied to an array output interface 54.

The A/V server 1 has a CPU 60 composed of for example a microprocessor. The CPU 60 has a RAM, a ROM, and other required structural portions. Corresponding to a predetermined program, the CPU 60 causes the processor 4 to perform various controlling processes. As will be described later, the CPU 60 has a file manager function for managing the HDD array 5 and a data manager function for managing commands to the HDD array 5. In the file manager function, the CPU 60 handles address information that represents the relation between addresses and data of the HDD array 5. With the file manager function, the CPU 60 obtains for example free area information of the HDD array 5.

The CPU 60 receives a write command from a host controlling system 61 such as a program delivering system. The write command causes the CPU 60 to record for example video data. Corresponding to the write command, the CPU 60 generates a predetermined command for the HDD array 5 with the data manager function. The generated command is supplied to the array output interface 54. The array output interface 54 adds the command received from the CPU 60 to video data and audio data received from the memories 52 and 53, adds predetermined header information to the resultant data, and supplies the resultant data as a predetermined data stream to the HDD array 5.

FIGS. 10A, 10B, and 10C show an example of the data stream supplied to the HDD array 5. As shown in FIG. 10A, header information is placed at the beginning of the data stream. The header information is followed by a command, video data, and/or audio data. Alternatively, the command may not be followed by video data and audio data.

As shown in FIG. 10B, the command is composed of for example a video data write command and an audio data write command. As shown in FIG. 10C, each of the write commands is composed of a write instruction to the HDD array 5 and address designation information corresponding to the write instruction.

The address is a logical address to the HDD array 5. With the address, a write start address and a write end address are designated. In this example, video data is written from address "#0000001" to "#0001000" and audio data is written from addresses "#1000001" to "#1001000".

The HDD array 5 distributively writes the supplied video data and audio data to a plurality of HDDs 258 to 261 of the HDD array 5. At this point, the HDD array 5 converts the given logical address into physical addresses of the HDDs 258 to 261. The data is written and recorded to the HDDs 258 to 261 corresponding to the physical addresses.

Figure 11:
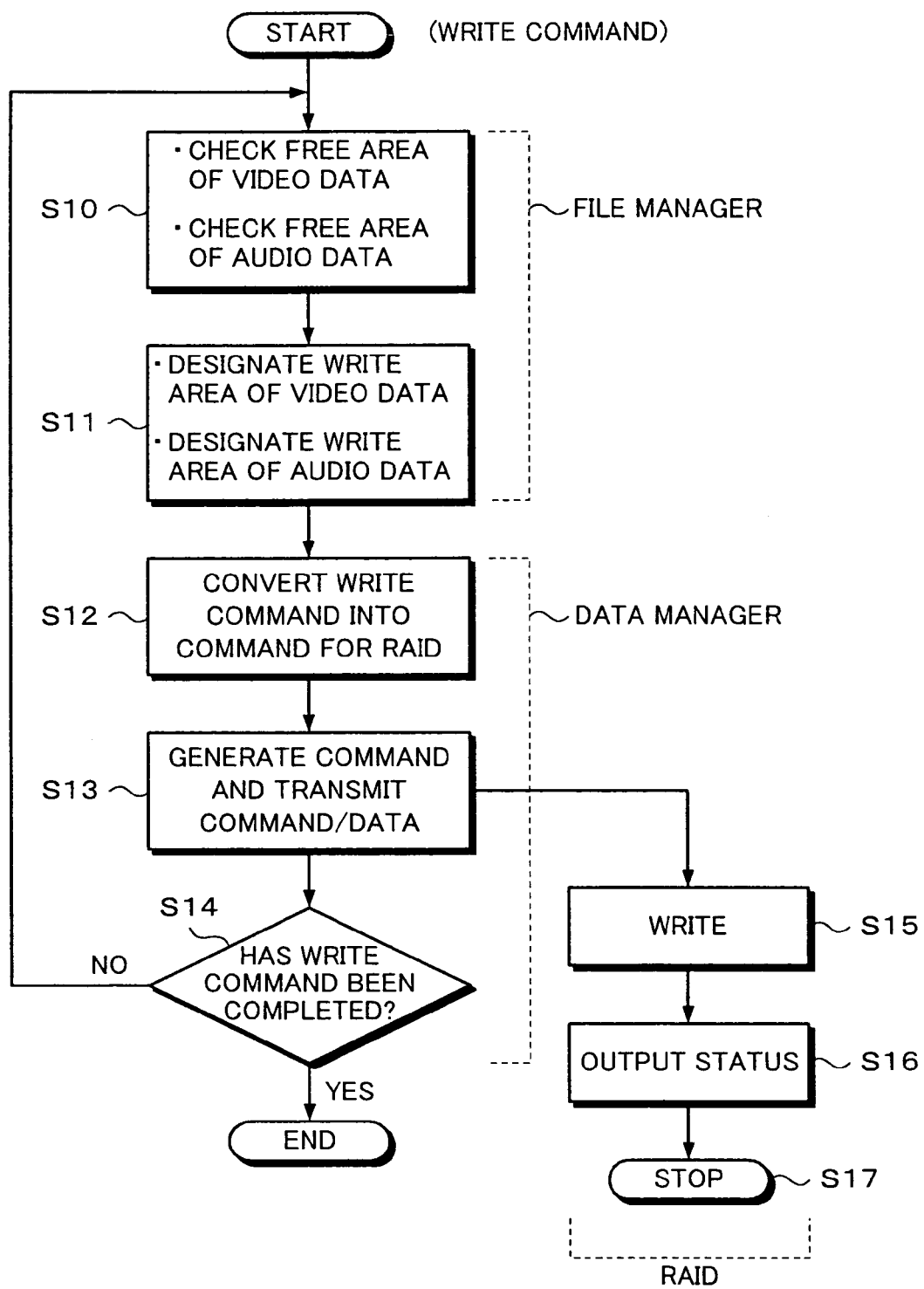
FIG. 11 is a flow chart showing a process of the A/V server in the case that data is written to an HDD array.

FIG. 11 is a flow chart showing a writing process performed by the A/V server 1. In the writing process, the A/V server 1 writes data to the HDD array 5. The writing process shown in FIG. 11 is composed of three sub-processes that are a sub-process as the file manager function of the CPU 60 of the processor 4, a sub-process as the data manager function, and a sub-process performed by the HDD array 5. First of all, the host controlling system 61 transmits the write command to the A/V server 1. The write command causes the A/V server 1 to record material data composed of video data and audio data. In addition, the write command represents time information of the material data to be recorded. The write command is received by the A/V server 1 (CPU 60).

The material data recorded corresponding to the write command is supplied from the outside of the apparatus to a terminal 50.

When the CPU 60 receives the write command, the CPU 60 checks free areas of the video area and audio area of the HDD array 5 with the file manager function (at step S10). In other words, the CPU 60 determines whether or not an area corresponding to the time information of the material data designated by the write command can be allocated to the HDD array 5.

When the material data is video data for five minutes and audio data corresponding thereto, the CPU 60 determines whether the areas for the video data and the audio data can be successively allocated to the HDD array 5. When the desired areas can be allocated, the flow advances to step S11. At step S11, the CPU 60 designates the areas for the video data and the audio data with logical addresses of the HDD array 5.

Figures 12A, 12B:
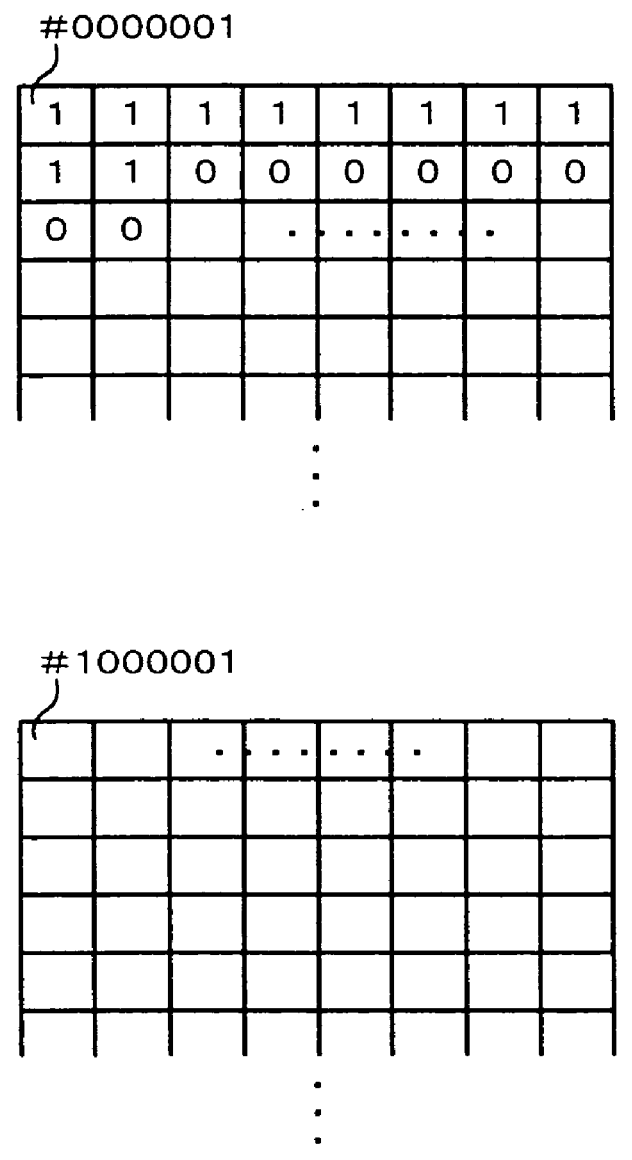

When data is written, the CPU 60 generates maps of logical addresses of video data and audio data to be written. FIGS. 12A and 12B show examples of maps of logical addresses. FIG. 12A shows a map for logical addresses for video data. FIG. 12B shows a map for logical addresses for audio data. A logical address is assigned for a predetermined unit of video data (for example, every 16 frames). In the examples shown in FIGS. 12A and 12B, the upper left positions are the top addresses of the video area and the audio area.

In addition, as shown in FIGS. 12A and 12B, a flag that represents whether or not data has been written is placed at each address of each logical address map. When the flag value of a particular address is "0", after data is written to the address, the flag value changes to "1".

After a logical address of the record area is designated, the flow advances from the file manager function block to the data manager function block. At step S12, the write command is converted into a command for the HDD array 5 (namely, a command for RAID). The resultant write command is supplied to the array output interface 54. The command is placed in the data stream shown in FIG. 10 along with the video data and audio data received from the terminal 50 (at step S13). The write command and data placed on the data stream are supplied from the array output interface 54 to the HDD array 5.

After the writing process corresponding to the write command received from the host controlling system 61 is completed, the CPU 60 stops the process. When the process corresponding to the write command is not completed, the flow returns to step S10.

On the other hand, the RAID (namely, the HDD array 5) records video data and audio data corresponding to the write command placed on the data stream received from the array output interface 54 (at step S15). The write command represents the write start addresses and write end addresses of the video data and audio data as logical addresses. The video data and audio data are written to the HDDs 58 to 61 of the HDD array 5 corresponding to the designated logical addresses.

When data is recorded to the HDD array 5, status data that represents the status is output (at step S16). The status data is supplied to the CPU 60 through the array input interface 55 of the processor 4. The HDD array 5 stops until it receives the next command from the processor 4 (at step S17).

According to the embodiment, the CPU 60 pre-allocates the top addresses of the video area and the audio area before recording data to the HDD array 5. Thus, the video area and the audio area are allocated to the HDD array 5. According to the present invention, the divide ratio of the video area and the audio area is variably designated. For example, the divide ratio is designated corresponding to the data rates of the video data and the audio data so that the record time of the video data matches the record time of the audio data.

FIG. 13 shows an example of the divide ratio designated corresponding to the data rate of video data. In this example, as video data, there are four types of data rates: 20 Mbps (bits per second), 30 Mbps, 40 Mbps, and 50 Mbps. As audio data, there are four types of record modes: RAID-0 at 16 quantizing bits/4 channels, RAID-1 at 16 quantizing bits/4 channels, RAID-0 at 20 quantizing bits/4 channels, and RAID-1 at 20 quantizing bits/4 channels.

In RAID-0, data is distributively written to a plurality of hard disks. In RAID-1, as described above, the same data is written to a pair of hard disks as mirrored data. In the example shown in FIG. 13, video data and audio data are processed in different RAID systems as will be described later.

In the example shown in FIG. 13, when the data rate of video data is 20 Mbps and audio data is recorded corresponding to RAID-1 at 20 quantizing bits/4 channels, the divide ratio of the video area and the audio area is 57 to 43. On the other hand, when the data rate of video data is 50 Mbps and audio data is recorded corresponding to RAID-0 at 16 quantizing bits/4 channels, the drive ratio of video area and audio area is 89 to 11. Since the divide ratio of video area and audio area is varied corresponding to the data format to be handled, the record area can be effectively used.

In the above description, the divide ratio is the same in each RAID system. However, the divide ratio of video area and audio area may be varied corresponding to each RAID system.

Next, returning to FIG. 10, the reproducing system that reproduces data received from the HDD array 5 will be described. The controlling system 61 transmits a read command to the A/V server 1 (CPU 60). The read command causes the CPU 60 of the A/V server 1 to read and reproduce video data and audio data recorded at particular positions of the HDD array 5. The CPU 60 searches logical addresses of the video data and audio data recorded in the HDD array 5 corresponding to the read command with the file manager function. Corresponding to the logical addresses, the CPU 60 generates read commands for the video data and audio data to the RAID (namely, the HDD array 5). The read commands for the video data and audio data are supplied to the array output interface 54. The array output interface 54 places the read commands on a data stream shown in FIG. 10. The resultant data stream is supplied to the HDD array 5.

The video data and audio data are read from the video area and audio area of the HDD array 5 corresponding to the logical addresses designated by the read commands placed on the data stream. The video data is read for 16 frames at a time. After 16 frames of video data are successively read, audio data corresponding thereto is successively read. The video data and audio data that have been successively read are placed on the data stream shown in FIG. 10 and supplied to the array input interface 55 of the processor 4.

In the array input interface 55, video data and audio data are extracted from the received data stream. The video data is stored to a video temporary storing memory 56. The audio data is stored to an audio temporary storing memory 57. The memories 56 and 57 each have three discrete buffer memories that each store for example 16 frames as with the memories 52 and 53. In other words, each of the memories 56 and 57 has three banks. While buffering 16 frames of video data and audio data corresponding thereto, each of the memories 56 and 57 outputs 16 frames of video data and audio data corresponding thereto that were buffered. The data output timings of the memories 56 and 57 are controlled by the CPU 60. The video data and the audio data that are read from the memories 56 and 57 are supplied to the video/audio output interface 58. The video/audio output interface 58 converts the video data and audio data into serial data in a predetermined transmission format (for example, the SDI format). Output data of the video/audio output interface 58 is supplied to a terminal 59.

In the above-described example, the video area and audio area are pre-allocated so that the record time of the video data matches the record time of the audio data. However, the present invention is not limited to such a structure. In other words, video data and audio data may not be supplied as a pair. Thus, only video data or audio data may be supplied and recorded. In this case, a pre-allocated free area for the video area or audio area may become full before the other free area becomes full. In this case, when the free area for the audio area becomes full before the free area for the video data becomes full, part of the free area for the video area can be allocated to the free area for the audio area. Of course, when the free area for the video area becomes full before the free area for the audio area becomes full, part of the free area for the audio area can be allocated to the free area for the video area.

Next, a modification of the above-described embodiment will be described. In the above-described embodiment, in the HDD array 5, the RAID structure of the video area is the same as the RAID structure of the audio data. In contrast, in the modification, the RAID structure of the video area is different from the RAID structure of the audio area. For example, the video area is structured corresponding to RAID-3, whereas the audio area is structured corresponding to RAID-1. Thus, many channels of audio data can be handled.

Figure 14A:
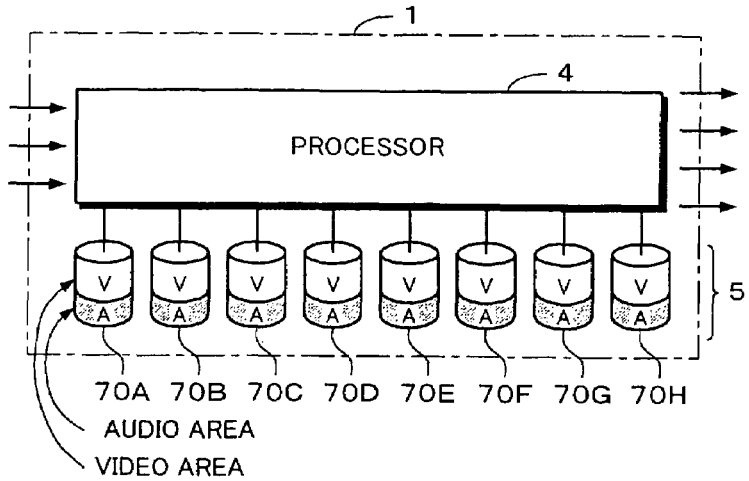
FIGS. 14A, 14B, 14C, and 14D are schematic diagrams showing an example of the structure of an A/V server according to a modification of the embodiment of the present invention.
Figure 14B:
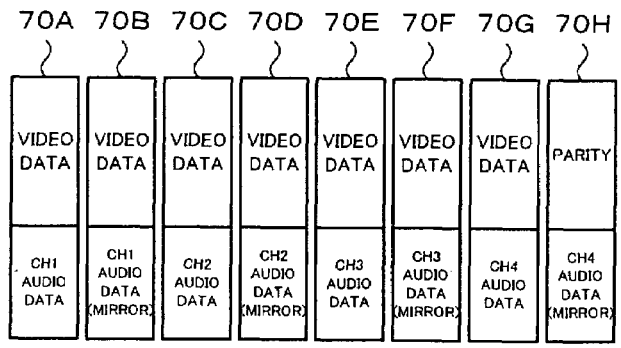
Figure 14C:
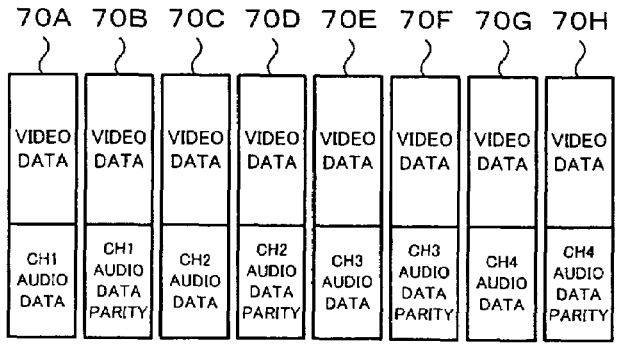
Figure 14D:
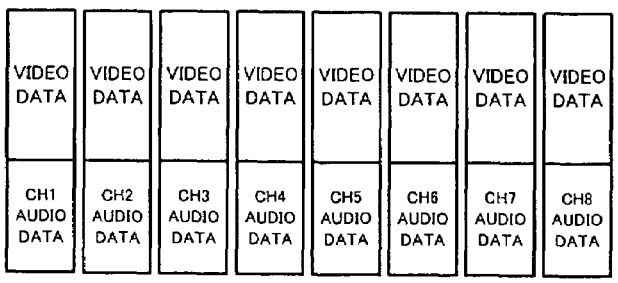

FIGS. 14A and 14B show an example of which the video area and the audio area are structured corresponding to RAID-3 and RAID-1, respectively. In this example, as shown in FIG. 14A, an HDD array is composed of eight HDDs 70A, 70B, 70C, 70D, 70E, 70F, 70G, and 70H. The HDD array is connected to a processor 4. Each of the record areas of the HDDs 70A to 70H is divided into a video area (denoted by "V" shown in FIG. 14A) and an audio area (denoted by "A" shown in FIG. 14A). The HDD array 5 is divided into a video area and an audio area.

As shown in FIG. 14B, in the video area of the HDD array 5, the HDDs 70A to 70G are used for video data. Parity for the video data recorded in the HDDs 70A to 70G is recorded to the HDD 70H.

On the other hand, in the audio area of the HDD array 5, pairs of the HDDs 70A and 70B, the HDDs 70C and 70D, the HDDs 70E and 70F, and the HDDs 70G and 70H are mirrored. In other words, one channel of audio data is recorded to the audio area of each HDD. A first channel of audio data is recorded to both the HDDs 70A and 70B. A second channel of audio data is recorded to both the HDDs 70C and 70D. A third channel of audio data is recorded to both the HDDs 70E and 70F. A fourth channel of audio data is recorded to both the HDDs 70G and 70H. Thus, with the eight HDDs, four channels of audio data are recorded.

According to the modification of the above-described embodiment, in the structure shown in FIG. 9, when input data is recorded to the HDD array 5, serial data is supplied from the terminal 50 to the video/audio input interface 51. In the video/audio input interface 51, video data and audio data are extracted from the serial data. The video data is supplied to the video temporary storing memory 52. The audio data is supplied to the audio temporary storing memory 53. When the storage capacities of the memories 52 and 53 are the same as those of the above-described embodiment, four channels of audio data corresponding to four frames of video data are stored to the memory 53. On the other hand, four frames of video data corresponding to the audio data are stored to the memory 52. The video data and the audio data that are read from the memories 52 and 53, respectively, are supplied to the array output interface 54. In the array output interface 54, the four frames of video data, the four channels of audio data corresponding thereto, and a write command are placed on a data stream shown in FIG. 10. The resultant data stream is supplied to the HDD array 5.

In the HDD array 5, video data of the supplied data stream is distributively recorded to the HDDs 70A to 70G. Parity data corresponding to the recorded data is recorded to the HDD 70H. Four channels of audio data are distributively recorded to the HDDs 70A, 70C, 70E, and 70G. In addition, the same four channels of audio data are distributively recorded to the HDDs 70B, 70D, 70F, and 70H. Of course, in the case of audio data, parity of data recorded in the HDDs 70A to 70G is not calculated. The same audio data as the HDD 70G is recorded to the HDD 70H.

When data recorded in each HDD is reproduced, data that is read from the HDDs 70A to 70G and parity that is read from the HDD 70H are combined as video data. Four channels of audio data are read from the HDDs 70A, 70C, 70E, and 70G. When a defect such as an error takes place in a particular HDD, relevant data is read from the paired HDD. The defective data is substituted with the relevant data. The obtained video data and audio data are placed on a data stream shown in FIG. 10. The resultant data stream is supplied from the HDD array 5 to the array input interface 55 of the processor 4. In the array input interface 55, video data and audio data are extracted from the data stream.

The video data is stored to the video temporary storing memory 56. The four channels of audio data are stored to the audio temporary storing memory 57. The video data and audio data that are read from the memories 56 and 57, respectively, are supplied to the video/audio output interface 58. In the video/audio output interface 58, the video data and audio data are converted into serial data corresponding to the SDI format. The resultant data is output from the terminal 59.

Unlike with video data, audio data of individual channels is read from individual positions. Thus, it is necessary to independently handle audio data of each channel. According to the modification of the embodiment, since audio data of each channel is recorded to two HDDs that are mirror-structured, audio data for each channel can be independently read. In addition, a disk defect can be handled independently for each channel.

As was described above, according to the present invention, since the record areas of the hard disks that compose the hard disk array are divided into video areas and audio areas, the seek time for which audio data is randomly accessed becomes short.

In addition, according to the present invention, the ratio of the record capacity for the video area and the record capacity for the audio data allocated in the hard disk array is designated so that the record time of the video data recorded in the video area matches the record time of the audio data recorded in the audio area. Thus, the record areas of the hard disk array can be effectively used.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

What is claimed is:

1. A data recording/reproducing apparatus designed to receive an input data and to generate an output data, comprising:
   a plurality of record media that are random-accessible, in which each of said plurality of record media is operable to store therein at least two different types of data, each type of data being stored in a respective circumferential area of the media that is radially allocated;
   recording and reproducing means for recording and reproducing data to and from said plurality of record media; and
   a plurality of input and output processing means for accessing said recording and reproducing means on time division basis, outputting said at least two different types of data that are received as input from outside the data recording/reproducing apparatus to said recording and reproducing means, and outputting the input data after processing the same,
   wherein each of said plurality of input and output processing means has:
   input means for outputting record area information and the data that is input from the outside to said reproducing and reproducing means so that the data is recorded to predetermined areas of said plurality of record media corresponding to the different types of data, and
   wherein said recording and reproducing means record the different types of data to the predetermined areas of said plurality of record media corresponding to the record area information that is output from said input means;
   wherein each of said random accessible record media is operable to store at least two different types of data thereby storing a higher quantity of data within each of said plurality of randomly accessible record media than storing only a single type of data therein.

2. The data recording and reproducing apparatus as set forth in claim 1,
   wherein the different types of data are video data and audio data.

3. The data recording and reproducing apparatus as set forth in claim 1,
   wherein the record area information is information representing an address of a record start position and an address of a record end position of one of said plurality of record media.

4. A data recording and reproducing method for accessing recording and reproducing means, outputting data to the recording and reproducing means, inputting reproduced data that is output from the recording and reproducing means, and outputting the data to the outside, the recording and reproducing means recording and reproducing the data to a record medium that is random-accessible on time division basis, the data containing different types of data that are input from the outside, the method comprising the steps of:
   outputting record area information and the data to the recording and reproducing means so that the different types of data are recorded to predetermined areas of the record medium, each type of data being recorded in a respective circumferential area of the media that is radially allocated;
   recording the different types of data to the predetermined areas of the record medium corresponding to the record area information that is output to the recording and reproducing means at the outputting step; and
   reproducing the different types of data from the predetermined areas of the record medium, outputting the different types of data on time division basis, and outputting them to the outside;
   wherein the record medium is operable to store at least two different types of data thereby storing a higher quantity of data in the randomly accessible record medium than storing only a single type of data therein.

5. The data recording and reproducing method as set forth in claim 4,
   wherein the different types of data are video data and audio data.

6. The data recording and reproducing method as set forth in claim 4,
   wherein the record area information is information representing an address of a record start position and an address of a record end position of the record medium.

7. A data recording apparatus, comprising:
   a record medium that is random-accessible and which is operable to store therein at least two different types of data, each type of data being stored in a respective circumferential area of the media that is radially allocated;
   recording means for recording data to said record medium; and
   a plurality of output processing means for accessing said recording means on time division basis and outputting said at least two different types of data that are input from the outside to said recording means, wherein each of said output processing means has:

input means for outputting record area information and the data to said recoding means so that the different types of data are recorded to predetermined areas of said record medium, and wherein said recording means records the different types of data to the predetermined areas corresponding to the record area information that is output from said input means;

wherein the record medium is operable to store at least two different types of data thereby storing a higher quantity of data in the randomly accessible record media than storing only a single type of data therein.

8. The data recording apparatus as set forth in claim 7, wherein the different types of data are video data and audio data.

9. The data recording apparatus as set forth in claim 7, wherein the record area information is information representing an address of a record start position and an address of a record end position of said record medium.

10. A data recording method for accessing recording and reproducing means, outputting data to the recording and reproducing means, and recording the data to the recording and reproducing means, the recording and reproducing means recording the data to a record medium that is random-accessible on time division basis, the data containing different types of data that are input from the outside, the method comprising the steps of:

outputting record area information and the data to the recording and reproducing means so that the different types of data are recorded to predetermined areas of the record medium, each type of data being recorded in a respective circumferential area of the media that is radially allocated; and recording the different types of data to the predetermined areas of the record medium corresponding to the record area information that is output to the recording and reproducing means at the outputting step;

wherein the record medium is operable to store at least two different types of data thereby storing a higher quantity of data in the randomly accessible record medium than storing only a single type of data therein.

11. The data recording and reproducing method as set forth in claim 10, wherein the different types of data are video data and audio data.

12. The data recording and reproducing method as set forth in claim 10, wherein the record area information is information representing an address of a record start position and an address of a record end position of the record medium.

13. A data recording and reproducing apparatus, comprising:

a record medium that is random-accessible and which is operable to store therein at least two different types of data, each type of data being stored in a respective circumferential area of the media that is radially allocated;

recording and reproducing means for recording and reproducing the data to and from said record medium, the data containing video data and audio data; and a plurality of input and output processing means for accessing said recording and reproducing means on time division basis, outputting data that is input from the outside to said recoding and reproducing means, inputting data reproduced by said recording and reproducing means, and outputting the data to the outside, wherein each of said input and output processing means has:

input means for changing the divide ratio of a record area for video data and a record area for audio data of said record medium corresponding to at least the data that is input from the outside and outputting record area information and the data to said recording and reproducing means so that the video data and the audio data are recorded to predetermined areas of the record medium, and wherein said recording and reproducing means records the data to the predetermined areas of the record medium corresponding to the record area information that is output from said input means, reproduces the data from said record medium, and outputs the reproduced data to each of said input and output processing means on time division basis;

wherein the record medium is operable to store at least two different types of data thereby storing a higher quantity of data in the randomly accessible record medium than storing only a single type of data therein.

14. The data recoding and reproducing apparatus as set forth in claim 13, wherein each of said input and output processing means changes the divide ratio corresponding to the transmission rate of the video data that is input from the outside and the number of channels of the audio data.

15. The data recoding and reproducing apparatus as set forth in claim 14, wherein said record medium that is random-accessible is a disc shaped record medium, and wherein each of said input and output processing means changes the divide ratio corresponding to a recording method of RAID for the audio data along with the transmission rate of the video data and the number of channels of the audio data.

16. The data recoding and reproducing apparatus as set forth in claim 13, wherein the record area information is information representing an address of a record start position and an address of a record end position of said record medium.

17. A data recording and reproducing method for accessing according and reproducing means, outputting data to the recording and producing means, inputting reproduced data that is output from the recording and reproducing means, and outputting the data to the outside, the recoding and reproducing means recording and reproducing the data to and from a record medium that is random-accessible, the data containing video data and audio data that are input from the outside, the method comprising the steps of:

changing the divide ratio of a record area for the video data and a record area for the audio data on the record medium corresponding to at least the data that is input from the outside and outputting record area information and the data to the recording and reproducing means so that the video data and the audio data are recorded to different record areas of the record medium, each in a respective circumferential area of the media that is radially allocated;

recording the video data and the audio data to the different record areas of the record medium corresponding to the record area information that is output to the recording and reproducing means at the changing step; and reproducing the data from the record medium and outputting the reproduced data to each of input and output processing means;

wherein the record medium is operable to store at least two different types of data resulting in more data being stored in the randomly accessible record medium than storing only a single type of data therein.

18. The data recording and reproducing method as set forth in claim 17, wherein the changing step is performed by changing the divide ratio corresponding to the transmission rate of the video data that is input from the outside and the number of channels of the audio data.

19. The data recording and reproducing method as set forth in claim 18, wherein the record medium that is random accessible is a disc shaped record medium, and wherein the changing step is performed by changing the divide ratio corresponding to a recording method of RAID for the audio data along with the transmission rate of the video data and the number of channels of the audio data.

20. The data recording and reproducing method as set forth in claim 17, wherein the record area information is information representing an address of a record start position and an address of a record end position of the record medium.

21. A data recording apparatus, comprising:

a record medium that is random-accessible and which is operable to store therein at least two different types of data, each type of data being stored in a respective circumferential area of the media that is radially allocated;

recording means for recording the data that contains at least video data and audio data to said record medium;

a plurality of input and output processing means for accessing said recording means on time division basis and outputting data that is input from the outside to said recording means, wherein each of said input and output processing means has:

input means for changing the divide ratio of a record area for the video data and a record area for the audio data of said record medium corresponding to at least the data that is input from the outside and outputting record area information and the data to said recording means so that the video data and the audio data are recorded to different record areas of said record medium, and wherein said recording means records the data to the different record areas of said record medium corresponding to the record area information that is output from said input means;

wherein the record medium is operable to store at least two different types of data resulting in more data being stored within the randomly accessible record medium than storing only a single type of data therein.

22. The data recording apparatus as set forth in claim 21, wherein each of said input and output processing means changes the divide ratio corresponding to the transmission rate of the video data that is input from the outside and the number of channels of the audio data.

23. The data recording apparatus as set forth in claim 22, wherein said record medium that is random-accessible is a disc shaped record medium, and wherein each of said input and output processing means changes the divide ratio corresponding to a recording method of RAID for the audio data along with the transmission rate of the video data and the number of channels of the audio data.

24. The data recording apparatus as set forth in claim 21, wherein the record area information is information representing an address of a record start position and an address of a record end position of said record medium.

25. A data recording method for accessing recording means, outputting data to the recording means, and recording the data, the recording means recording the data to a record medium that is random-accessible on the time division basis, the data containing video data and audio data that are input from the outside, the method comprising the steps of:

changing the divide ratio of a record area for video data and a record area for audio data of the record medium corresponding to at least the data that is input from the outside and outputting record area information and the data to the recording means so that the video data and the audio data are recorded to the different record areas of the record medium, each in a respective circumferential area of the media that is radially allocated; and recoding the video data and the audio data to the different record areas of the record medium corresponding to the record area information that is output to the recording means at step (a));

wherein the record medium is operable to store at least two different types of data resulting in more data being stored within the randomly accessible record medium than storing only a single type of data therein.

26. The data recording method as set forth in claim 25, wherein the changing step is performed by changing the divide ratio corresponding to the transmission rate of the video data that is input from the outside and the number of channels of the audio data.

27. The data recording method as set forth in claim 26, wherein the record medium that is random-accessible is a disc shaped record medium, and wherein the changing step is performed by changing the divide ratio corresponding to a recording method of RAID for the audio data along with the transmission rate of the video data and the number of channels of the audio data.

28. The data recording method as set forth in claim 25, wherein the record area information is information representing an address of a record start position and an address of a record end position of the record medium.

* * * * *